(12) United States Patent
Liu et al.

(10) Patent No.: US 11,173,783 B2
(45) Date of Patent: Nov. 16, 2021

(54) MAGNETIC CONTROL WHEEL BASED ON ELECTROMAGNETIC PROPULSION SYSTEM

(71) Applicant: HEFEI LONGTOTEM INFORMATION TECHNOLOGY CO., LTD., Anhui (CN)

(72) Inventors: Guang Liu, Hefei (CN); Gongqing Zhang, Hefei (CN)

(73) Assignee: HEFEI LONGTOTEM INFORMATION TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 16/339,354

(22) PCT Filed: May 8, 2018

(86) PCT No.: PCT/CN2018/085959
§ 371 (c)(1),
(2) Date: Mar. 16, 2020

(87) PCT Pub. No.: WO2019/037469
PCT Pub. Date: Feb. 28, 2019

(65) Prior Publication Data
US 2020/0276898 A1 Sep. 3, 2020

(30) Foreign Application Priority Data
Aug. 23, 2017 (CN) .......................... 201710731479.X (51) Int. Cl.
*H02K 1/14* (2006.01)
*B60K 7/00* (2006.01)
(Continued)

(52) U.S. Cl.
CPC .......... *B60K 7/0007* (2013.01); *H02K 1/145* (2013.01); *H02K 5/24* (2013.01); *H02K 7/006* (2013.01);
(Continued)

(58) Field of Classification Search
CPC .................... B60K 7/00; B60K 7/0007; B60K 2007/0038; B60K 2007/0092; H02K 1/14;
(Continued)

(56) References Cited

U.S. PATENT DOCUMENTS 5,691,584 A * 11/1997 Toida ...................... H02K 11/33
310/67 R
8,720,623 B1 * 5/2014 Kim ........................ B60K 11/02
180/65.51
(Continued)

FOREIGN PATENT DOCUMENTS

CN 203416142 1/2014
CN 103887907 6/2014
(Continued)

OTHER PUBLICATIONS

JP 20140502454—Mar. 2014.

*Primary Examiner* — Naishadh N Desai (57) ABSTRACT

A magnetically controlled wheel based on electromagnetic propulsion system includes a magnetron wheel body, a stator core, a main shaft, a bearing part, a rotor core and a wear-resistant tire, wherein the main shaft is mounted on the middle part of the magnetron wheel body; the outer end of the main shaft is connected with a shaft cap; the inner end of the main shaft is welded with a fixed shaft; the stator core is welded on the main shaft; the outer side of the stator core is provided with a plurality of protruding claw poles; the claw poles are wound with a stator winding; the rotor core is sleeved on an outer of the stator core; the inner wall of the rotor core is provided a plurality of rotor teeth poles; and the
(Continued)

rotor teeth poles are wound with a field winding. The assembling is convenient, the shock absorption performance of the magnetic control wheel body is enhanced, the movement of the magnetic control wheel body is realized, the consumed energy is provided through conversion by electric energy, the speed of the existing vehicle is raised, the bearing piece increases rotation stability of the rotor iron core, a plurality of tire surface inner supporting pieces, a magnetic insulation ring and the wear-resisting tire, the magnetic control wheel body can be driven to rotate reversely conveniently, and steering of the magnetic control wheel body is realized.

8 Claims, 5 Drawing Sheets

(51) Int. Cl.
  *H02K 5/24* (2006.01)
  *H02K 7/00* (2006.01)
  *H02K 7/08* (2006.01)
  *H02K 23/24* (2006.01)
(52) U.S. Cl.
  CPC ............ *H02K 7/088* (2013.01); *H02K 23/24* (2013.01); *B60K 2007/0092* (2013.01)

(58) Field of Classification Search
  CPC ............ H02K 23/24; H02K 5/24; H02K 7/00; H02K 7/08; H02K 13/02; H02K 7/006; H02K 7/088; H02K 13/003; H02K 7/14; H02K 19/10; H02K 1/145
  See application file for complete search history.

(56) References Cited

U.S. PATENT DOCUMENTS

| | | | |
|---|---|---|---|
| 2004/0080223 A1* | 4/2004 | Shimizu | H02K 7/14 |
| | | | 310/750 |
| 2004/0099455 A1* | 5/2004 | Nagaya | B60G 3/20 |
| | | | 180/65.51 |
| 2005/0247496 A1* | 11/2005 | Nagaya | B60K 7/0007 |
| | | | 180/65.51 |
| 2013/0092467 A1* | 4/2013 | Jager | B60K 17/26 |
| | | | 180/243 |
| 2017/0174096 A1* | 6/2017 | Wang | B60K 7/0007 |
| 2018/0056767 A1* | 3/2018 | Dolgov | B60K 17/043 |

FOREIGN PATENT DOCUMENTS

| | | |
|---|---|---|
| CN | 105610292 | 5/2016 |
| CN | 106981965 | 7/2017 |
| CN | 107370291 | 11/2017 |

* cited by examiner

MAGNETIC CONTROL WHEEL BASED ON ELECTROMAGNETIC PROPULSION SYSTEM

FIELD OF THE INVENTION

The present invention relates generally to the vehicle technology field, and more particularly to a magnetically controlled wheel based upon electromagnetic propulsion system.

BACKGROUND OF THE INVENTION

An existing vehicle device is all equipped with wheels. A wheel in existing structure usually includes an axle, a hub, a rim, and a tire. An outer circumference of the hub usually employs a rubber tire and maintains inflated by inflation. Once the inflation of the rubber tire is insufficient or the air in the rubber tire is lost, the wheel may not run. When driven in a road of poor conditions, the vehicle may bump caused by pits and bumps with the wheels of extremely bad cushioning performance, demanding an additional shock mitigation system. The existing wheels, especially in automotive applications, are usually driven by a rotating axle which is driven by the drive system of vehicle to realize the running of the vehicle, requiring combustion of gasoline and diesel to generate the driving force in the engine to drive the axle to rotate through the transmission mechanism, in which the structure is complicated and of big fuel consumption. As a result, a vehicle employed the existing wheels is not only of a complex structure and of a high cost, but also of a heavy fuel consumption and of a low speed, in which both the hub and the axle wear serious and the drive mode is unable to be simplified. Therefore, there is a need to improve the existing wheels.

SUMMARY OF THE INVENTION

The present disclosure aims to provide a magnetic controlled wheel based on electromagnetic propulsion system to resolve aforementioned problems in background art.

In order to realize the said objective, the present disclosure proposes technical solutions as follows:

A magnetic controlled wheel based on electromagnetic propulsion system includes a magnetron wheel body, a stator core, a main shaft, a bearing part, a rotor core and a wear-resistant tire, wherein the main shaft is mounted on the middle of the magnetron wheel body; the outer end of the main shaft is connected with a shaft cap, and the inner end of the main shaft is welded with a fixed shaft; the stator core is welded on the main shaft; the outer side of the stator core is provided with a plurality of protruding claw poles; the claw poles are wound with a stator winding; the rotor core is sleeved on the outer sleeve of the stator core; the inner wall of the rotor core is provided with a plurality of rotor teeth poles, and the rotor teeth poles are wound with a field winding. A commutating pole core is welded on the inner wall of the rotor core, and a commutating pole winding is wound on the commutating pole core. Both sides of the inner wall of the rotor core are welded with a magnetic isolation inner retaining ring, and a retaining ring is embedded in the outer side of a the magnetic isolating inner retaining ring; the outer end face of the retaining ring is embedded in inner side of a retaining outer ring. The retaining outer ring is welded on the lateral inner wall of the rotor core. The bearing part is welded in the middle of an inner wall of the retaining ring. The bearing part includes an inner ring, a roller, and an outer ring. A plurality of tread inner supporting sheets are welded on the outer wall of the rotor core; the outer ends of the tread inner supporting sheets are welded on the inner wall of the magnetic isolating ring. Both the magnetic isolating ring and a plurality of tread inner supporting sheets are installed in the wear-resistant tire, and the wear-resistant tire is assembled on the outer side of the rotor core. The main shaft is fixed at its inner end with a terminal A and a terminal B. The terminal A is connected to the winding end wire of the stator winding through a wire embedded in the main shaft, the terminal B is connected to the conductive ring fixed on the main shaft through the wire embedded in the main shaft. A collecting ring is fixed on and electrically connected to the outer wall of the conductive ring, in which the outer wall of the collecting ring is abutted against a brush.

As a further technical solution of the present disclosure, the main shaft, shaft cap and fixed shaft are set to install along the same axis.

As a further technical solution of the present disclosure, a pole shoe is welded on the inner end face of the rotor teeth pole, in which the inner side of the pole shoe is paralleled to the outer side of the claw pole with 5~10 mm air cleft in-between.

As a further technical solution of the present disclosure, the inner side of the magnetic isolating inner retaining ring is abutted against the side of the rotor teeth pole.

As a further technical solution of the present disclosure, the outer ring is welded to the middle of the inner wall of the retaining ring, the inner ring is welded to the main shaft on both sides of the stator core, the roller is installed in the guide groove between the inner ring and the outer ring, and the inner ring of the bearing part is connected to the outer ring of the bearing part via rolling of roller.

As a further technical solution of the present disclosure, the outer ring is connected to magnetic isolating inner retaining ring via a locking bolt.

As a further technical solution of the present disclosure, all tilt angles of the tread inner supporting sheets relative to the outer wall of the rotor core are the same, and the tilt angle between the tread inner supporting sheet and the outer wall of the rotor core is 15-30 degrees.

As a further technical solution of the present disclosure, the brush is connected to the winding end wire of the field winding through a wire embedded in the magnetic isolating inner retaining ring.

As a further technical solution of the present disclosure, the inner end of the main shaft is also fixed with a terminal C and the terminal C is connected to another conductive ring fixed to the main shaft through wires embedded in the main shaft, in which a collector ring is fixed on and electrically connected to the outer wall of the conductive ring, and the collector ring is abutted against winding end-wire brush of the commutating pole winding.

Compared with the prior art, the present disclosure shows advantageous effects as follows:

The magnetic controlled wheel based on the electromagnetic propulsion system is of easy assembly and stable operation, in which the easy assembly of the bearing part enables the rotor core to rotate around the main shaft without worrying about wear and tear of hub and axle, in which a plurality of tread inner supporting sheets are not only capable of playing a good role in supporting but also able to cushion the impact by the micro-deformation of tread inner supporting sheets in the event of impact to enhance the shock absorption performance of magnetron wheel body.

When a three-phase alternating current with a phase separation of 120° is applied to the field winding, a rotating magnetic field may be generated and an electromagnetic torque for the main shaft may be generated by electromagnetic force as well. Since the main shaft is welded to the fixed shaft, the rotor core may be subjected to a reverse drive to rotate itself along the reverse direction of the rotating magnetic field, and accordingly the rotor core may drive a plurality of tread inner supporting sheets, magnetic barrier rings and wear-resistant tire to rotate so as to achieve the movement of the magnetic control wheel body, in which the energy consumed are supplied by the conversion of electrical energy. Therefore, the magnetron wheel of fast operation speed and no fuel consumption is installed on the vehicle to raise the speed of existing vehicle.

The bearing part between the rotor core and the main shaft increases the rotation stability of a rotor core, a plurality of tread inner supporting sheets, a magnetic isolating ring, and a wear-resistant tire, and changes the directions of current respectively in stator winding, field winding and commutating pole winding so that accordingly reverse currents are increased, which may facilitate driving the magnetron wheel body to reversely rotate and realize the steering of the magnetic control wheel body.

REFERENCE CHARACTERS IN THE DRAWINGS:

In the drawings, the following reference characters note the following component parts:
1—Magnetron Wheel Body,
2—Stator Core,
3—Stator Winding,
4—Main Shaft,
5—Shaft Cap,
6—Bearing Part,
7—Locking Bolt,
8—Retaining Ring,
9—Rotor Core,
10—Wear-Resistant Tire,
11—Field Winding,
12—Rotor Teeth Pole,
13—Tread Inner Supporting Sheet,
14—Magnetic Isolating Retaining Ring,
15—Retaining Outer Ring,
16—Brush,
17—Collector Ring,
18—Conductive Ring,
19—Terminal A,
20—Fixed Shaft,
21—Terminal B,
22—Inner Ring,
23—Roller,
24—Outer Ring,
25—Magnetic Isolating Ring,
26—Pole Shoe,
27—Claw Pole,
28—Commutating Pole Core,
29—Commutating Pole Winding.

DETAILED DESCRIPTION OF THE ILLUSTRATED EMBODIMENTS

Combined with the accompanying drawings in embodiments of the present disclosure, the technical solutions in embodiments of the present disclosure will be described clearly and integrally below. Apparently, the described embodiments are merely part of examples but not all of embodiments of the present disclosure. Based on the embodiments of present disclosure all other embodiments obtained by the ordinary skilled in the art without any creative working shall fall within the protection scope of the present disclosure.

With reference to FIG. 1-5, in the embodiments of the present disclosure, a magnetic controlled wheel based on electromagnetic propulsion system includes a magnetron wheel body 1, a stator core 2, a main shaft 4, a bearing part 6, a rotor core 9 and a wear-resistant tire 10. The main shaft 4 is mounted on the middle of the magnetron wheel body 1. The outer end of the main shaft 4 is connected with a shaft cap 5, and the inner end of the main shaft 4 is welded with a fixed shaft 20. The main shaft 4, the shaft cap 5 and the fixed shaft 20 are set to install along the same axis. The main shaft 4 is welded with the stator core 2. The outer side of the stator core 2 has a plurality of protruding claw poles 27. The claw poles 27 are wound with a stator winding 3. The rotor core 9 is sleeved on an outer of the stator core 2. The inner wall of the rotor core 9 has a plurality of rotor teeth poles 12, a pole shoe 26 is welded on the inner end face of the rotor teeth pole 12, in which the inner side of the pole shoe 12 is paralleled to the outer side of the claw pole 27 with 5-10 mm air cleft in-between. The rotor teeth poles 12 are wound with a field winding, the inner wall of rotor core 9 is welded with a commutating pole core 28 and the commutating pole core 28 is wound with commutating pole winding 29.

Figure 1:
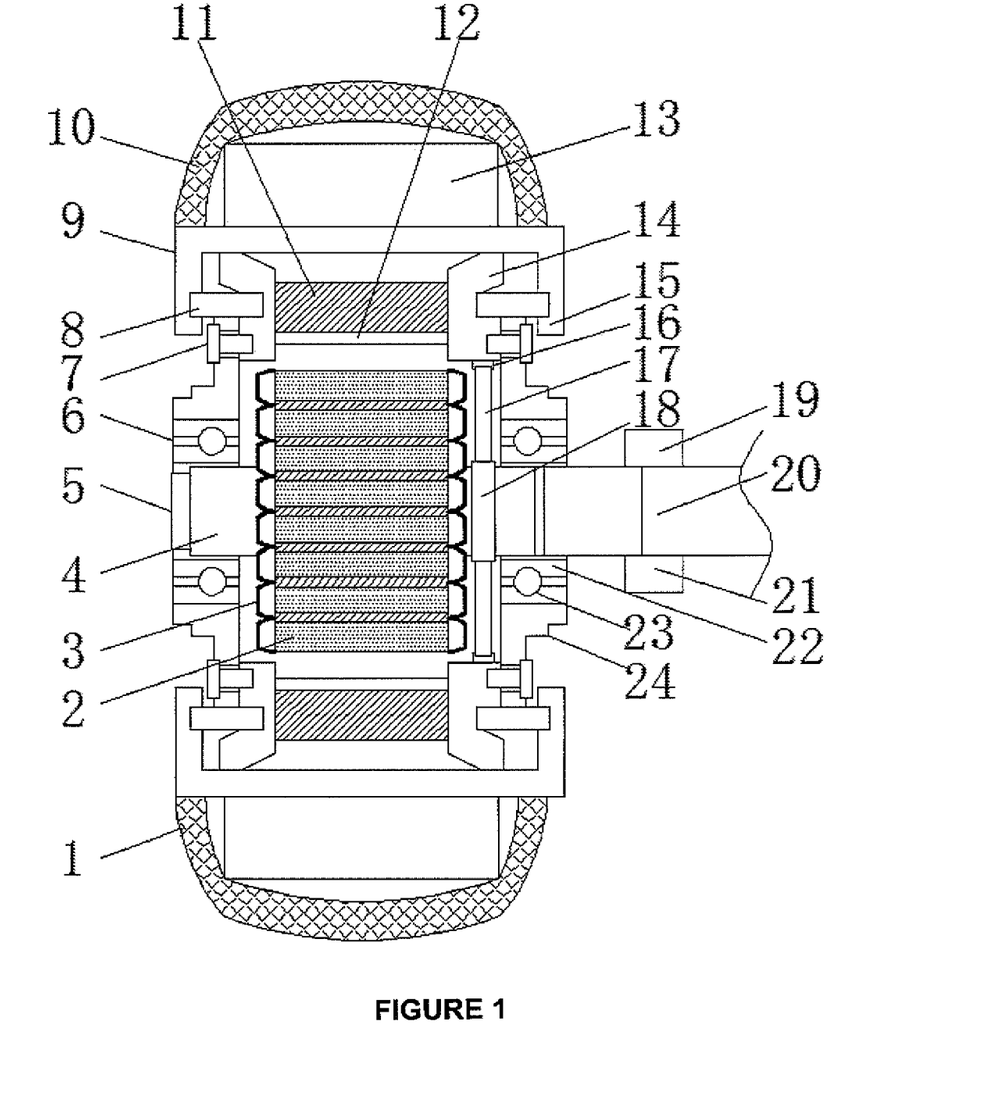
FIG. 1 is a schematic structural diagram of the present disclosure.
Figure 2:
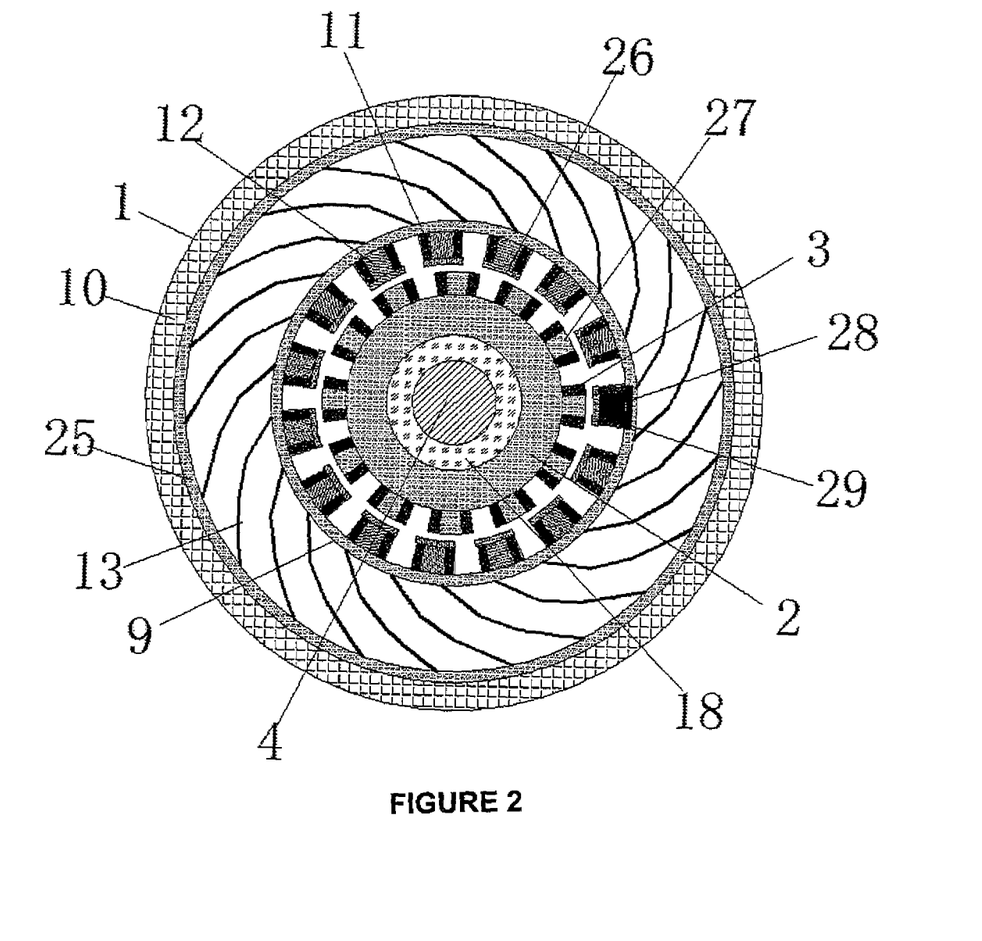
FIG. 2 is a schematic structural diagram of the stator core in the present disclosure.
Figure 3:
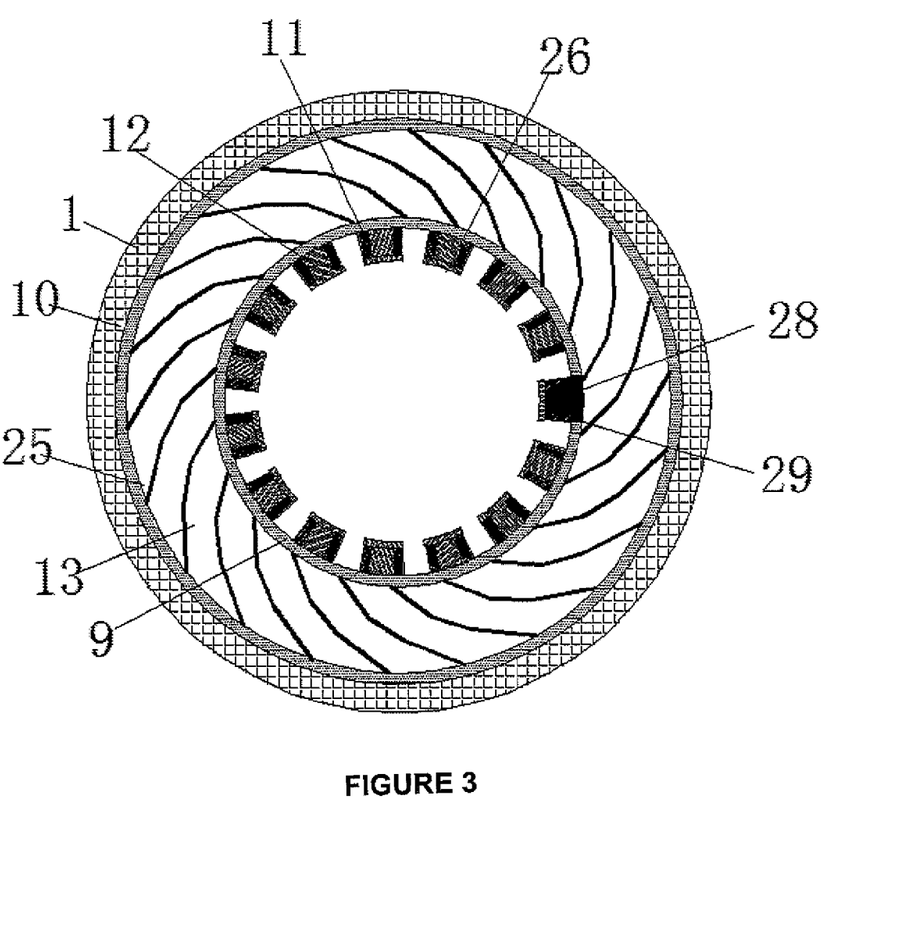
FIG. 3 is a schematic structural diagram of the rotor core of the present disclosure.
Figure 5:
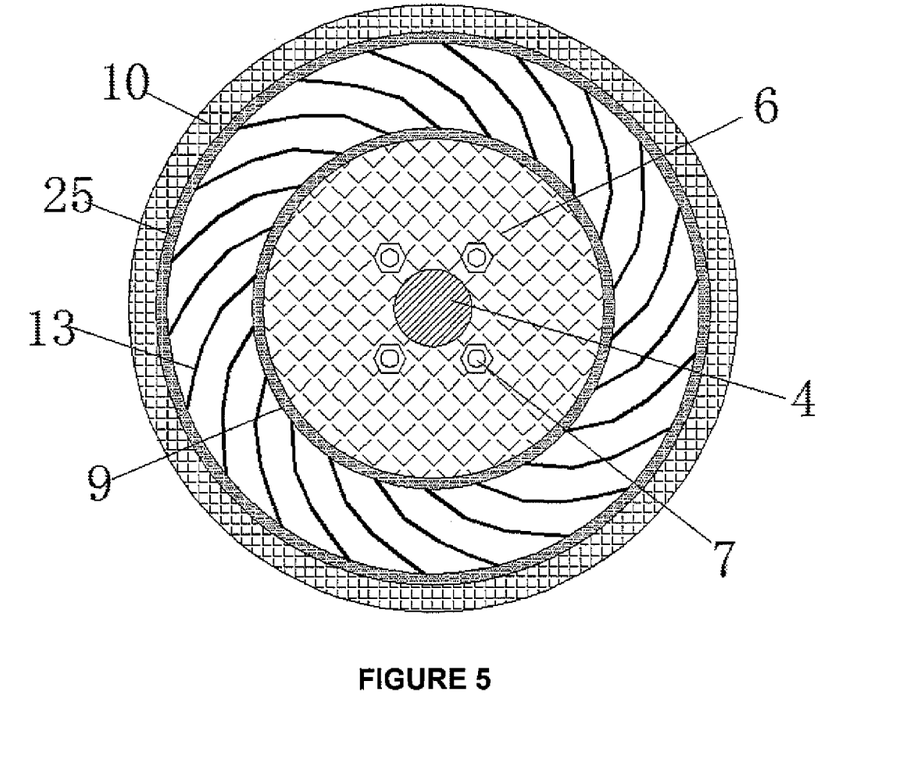
FIG. 5 is a schematic structural diagram of the bearing part in the present disclosure.

Both sides of the inner wall of the rotor core 9 are welded with a magnetic isolation inner retaining ring 14, and an inner side of the magnetic isolating inner retaining ring 14 is abutted against the side of the rotor teeth pole 12. A retaining ring 8 is embedded outer side of the magnetic isolating inner retaining ring 14. The outer end face of the retaining ring 8 is embedded inner side of a retaining outer ring 15. The retaining outer ring 15 is welded on the lateral inner wall of the rotor core 9. Bearing part 6 is welded in the middle of the inner wall of the retaining ring and the bearing part includes an inner ring 22, a roller 23, and an outer ring 24. The outer ring 24 is welded with the middle inner wall of retaining ring and the inner ring is welded to the main shaft 4 on both sides of the stator core 2, the roller 23 is installed in the guide groove between the inner ring 22 and the outer ring 24, and the inner ring 22 of the bearing part 6 is connected to the outer ring 24 of the bearing part via rolling of roller 23. The outer ring 24 is connected to magnetic isolating inner retaining ring 14 via a locking bolt 7, which is convenient for the rotor core 9 to rotate around the main shaft 4.

Figure 4:
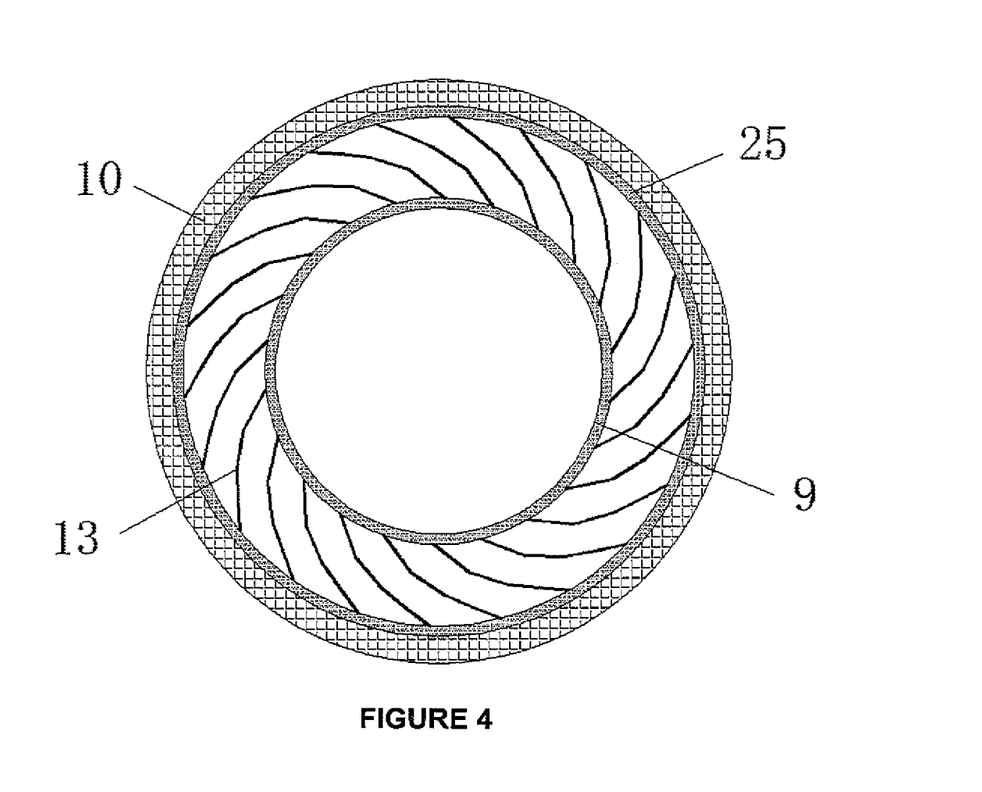
FIG. 4 is a schematic structural diagram of the tread inner supporting sheet in the present disclosure.

A plurality of tread inner supporting sheets 13 are welded on the outer wall of the rotor core 9. Outer ends of tread inner supporting sheets 13 are welded on the inner wall of the magnetic isolating ring 25. All tilt angles of the tread inner supporting sheets relative to the outer wall of the rotor core are the same, and the tilt angle between the tread inner supporting sheet and the outer wall of the rotor core is preferably 15-30 degrees which is not only capable of playing a good role in supporting but also able to cushion by the deformation of the tread inner supporting sheets in the event of impact. Both the magnetic isolating ring 25 and a plurality of the tread inner supporting sheets 13 are installed in a wear-resistant tire 10. The outer side of the rotor core 9 is assembled with the wear-resistant tire 10 and the inner wall of the wear-resistant tire is support by the magnetic isolating ring 25 and a plurality of the tread inner supporting sheets 13.

The main shaft 4 is fixed at its inner end with a terminal A 19 and a terminal B 21. The terminal A 19 is connected to the winding end wire of the stator winding 3 through a wire embedded in the main shaft 4, the terminal B 21 is connected to the conductive ring 18 fixed on the main shaft 4 through the wire embedded in the main shaft 4. A collecting ring 17 is fixed on and electrically connected to the outer wall of the conductive ring 17, in which the outer wall of the collecting ring 17 is abutted against a brush 16. The brush 16 is connected to a winding end wire of the filed winding 11 through the wire embedded in the magnetic isolating inner retaining ring 14.

The inner end of the main shaft 4 is also fixed with a terminal C and the terminal C is connected to another conductive ring 18 fixed to the main shaft 4 through wires embedded in the main shaft 4, in which a collector ring 17 is fixed on and electrically connected to the outer wall of the conductive ring 18, and the collector ring 17 is abutted against winding end-wire brush of the commutating pole winding 29.

The operating principle of the present disclosure is as follows:

While a vehicle installed the magnetic controlled wheels based on electromagnetic propulsion system works, the fixed shaft 20 welded on the inner end of the main shaft 4 is fixedly connected to the frame of the vehicle, and then respectively, the terminal A19 is electrically connected to stator winding 3, the terminal B21 is electrically connected to the field winding 11, and the terminal C is electrically connected to the commutation pole winding 29. When a three-phase alternating current with a phase separation of 120° is applied to the field winding, a rotating magnetic field will be generated. Since the rotating magnetic field rotates and the stator winding 3 is stationary, the rotating magnetic field of the stator will be cut by the stator winding 3 to generate an induced electromotive force. According to the right-hand rule, it is determined that both ends of the stator winding 3 are short-circuited by the short-circuiting ring, under the action of the induced electromotive force, the stator winding 3 will generate an induced current which is basically consistent with the direction of the induced electromotive force. The current-carrying conductor of the stator core 2 is subjected to an electromagnetic force in the rotor magnetic field, the direction of which is determined by the left-hand rule. And the electromagnetic force generates electromagnetic torque relative to the main shaft 4. Since the main shaft 4 is welded to the fixed shaft 20, the rotor core 9 is driven reversely to rotate along the opposite direction of the rotating magnetic field; thereby the rotor core 9 drives a plurality of tread inner supporting sheets 13, magnetic isolating ring 25 and wear-resistance tire 13, which realizes the movement of the magnetron wheel body 1. The bearing part 6 between the rotor core 9 and the main shaft 4 improves the rotation stability of t the rotor core 9, a plurality of tread inner supporting sheets 13, the magnetic isolating ring 25, and the wear-resistant tire 10, and changes the current direction in the stator winding 3, the field winding 11, and the commutation pole winding 29, which facilitates driving the magnetron wheel body 1 to reversely rotate and realizes the commutation of the magnetron wheel body 1.

The foregoing embodiments are not intended to limit the protection scope of the present disclosure. Any simple modification, equivalent, variation and alternative figured out by those of skilled in the art within the technical solutions disclosed in the present disclosure shall fall within the protection scope of the present disclosure.

It is explained that unless otherwise clear stipulation and definition, those terms "setting", "interconnection" and "connection" shall be general understanding such as connection may be permanent connection, detachable connection and integrated connection, also interconnection may be by the direct way, by a plurality of intermediation indirectly and internal connection between two units. The ordinary skilled in the art may understand each term of the present disclosure in accordance with the specific context.

What is claimed is:

1. A magnetically controlled wheel based on an electromagnetic propulsion system, comprising:
   a magnetron wheel body comprising a wear-resistant tire, and an annular magnetic isolating ring disposed internally within said wear-resistant tire;
   a stator core disposed internally within said magnetron wheel body and having a circumferential array of a plurality of claw poles disposed around an outer periphery of said stator core, wherein said plurality of claw poles disposed around said outer periphery of said stator core respectively have a plurality of stator windings wound thereon;
   a main shaft coaxially mounted within said magnetron wheel body and welded to said stator core, wherein an axially outer end of said main shaft has a shaft cap mounted thereon while an axially inner end of said main shaft is welded to a fixed shaft, and wherein said main shaft, said shaft cap, and said fixed shaft are coaxial with respect to each other;
   a bearing part annularly surrounding said main shaft and comprising a pair of annular inner roller bearing ring members, a pair of annular outer roller bearing ring members, and a plurality of roller bearings disposed within grooved portions defined within said annular inner rolling bearing ring members and said annular outer roller bearing ring members such that said annular inner roller bearing ring members and said annular outer roller bearing ring members operatively cooperate with each other through said plurality of roller bearings;
   a rotor core annularly surrounding said stator core, mounted upon said bearing part, and having a plurality of rotor teeth poles which are respectively wound with a plurality of field windings, wherein an inner peripheral wall portion of said rotor core is welded to a commutating pole core which is wound with a plurality of commutating pole windings, and wherein axially inner and axially outer annular magnetic isolating inner retaining rings are welded to axially inner and axially outer inner peripheral wall portions of said rotor core, axially inner and axially outer end retaining rings are integrally connected to axially inner and axially outer ends of said rotor core, and axially inner and axially outer retaining rings interconnect said axially inner and outer annular magnetic isolating inner retaining rings to said axially inner and outer end retaining rings; and
   a plurality of inner tread supporting sheets have radially inner end portions thereof which are welded to outer peripheral wall portions of said rotor core while outer end portions of said plurality of inner tread supporting sheets are welded to inner peripheral wall portions of said annular magnetic isolating ring disposed internally within said wear-resistant tire;

wherein said fixed shaft is provided with a first terminal and a second terminal, wherein said first terminal is electrically connected to said plurality of stator windings while said second terminal is electrically connected to a conductive ring mounted upon said main shaft, said conductive ring, being electrically connected to an annular collector ring which, in turn, is disposed in electrical contact with an annular brush operatively associated with said plurality of commutating pole windings.

2. The magnetically controlled wheel according to claim 1, wherein:

a plurality of pole shoes are respectively welded upon a radially inner face of each one of said plurality of rotor teeth poles, and a radially inner face of each one of said plurality of pole shoes is concentric with a radially outer face of each one of said plurality of claw poles with a a radial space of 5-10 mm defilned between each one of said radially inner faces of each one of said plurality of rotor teeth poles, and each one of said radially outer faces of each one of said plurality of claw poles.

3. The magnetically controlled wheel according to claim 1, wherein:

axially inner sides of said magnetic isolating inner retaining rings are disposed in abutment with axially outer sides of said plurality of rotor teeth poles.

4. The magnetically controlled wheel according to claim 1, wherein:

said annular outer roller bearing ring members are welded to axially central portions of said axially inner and axially outer retaining rings; and said axially inner and axially outer inner rings are welded to axially inner and axially outer portions of said main shaft so as to be disposed upon opposite sides of said rotor core.

5. The magnetically controlled wheel according to claim 1, wherein:

said axially inner and axially outer rings of said bearing part are fixedly connected to said axially inner and axially outer magnetic isolating inner retaining rings by a plurality of axially inner and axially outer locking bolts .

6. The magnetically controlled wheel according to claim 1, wherein:

all angular orientation of said plurality of inner tread supporting sheets, relative to said outer peripheral wall portions of said rotor core are the same and is within the range of 15-30 degrees.

7. The magnetically controlled wheel according to claim 1, wherein:

said annular brush is electrically connected to a field winding of said rotor through a wire embedded within said axially inner magnetic isolating inner retaining ring.

8. The magnetically controlled wheel according to claim 1, wherein:

a third terminal, mounted upon an axially inner end of said main shaft, is electrically connected to said conductive ring (18) fixed upon said main shaft;

said conductive ring is electrically connected to said annular conductive ring; and said annular conductive ring (17) is is disposed in contact with said brush of said commutating pole winding.

\* \* \* \* \*